US010628832B2

(12) United States Patent
Wiseman

(10) Patent No.: US 10,628,832 B2
(45) Date of Patent: Apr. 21, 2020

(54) METHOD FOR COMPOUNDING CENTERS AND/OR AGRICULTURE AGGREGATORS TO PUBLISH CURRENT REGULATORY STATUS ALONGSIDE CUSTOMIZED ACTIVE INGREDIENT FORMULARY PRICING BASED ON ROUTE, DOSAGE FORM, AND STRENGTH SPECIFIC REQUESTS THAT INCLUDES EXCIPIENTS AND LEVEL OF EFFORT

(71) Applicant: Todd Alan Wiseman, Tampa, FL (US)

(72) Inventor: Todd Alan Wiseman, Tampa, FL (US)

( * ) Notice: Subject to any disclaimer, the term of this patent is extended or adjusted under 35 U.S.C. 154(b) by 190 days.

(21) Appl. No.: 15/863,277

(22) Filed: Jan. 5, 2018

(65) Prior Publication Data

US 2018/0130070 A1 May 10, 2018

Related U.S. Application Data

(63) Continuation of application No. 14/492,005, filed on Sep. 20, 2014, now abandoned.

(51) Int. Cl.
*G06Q 40/00* (2012.01)
*G06Q 30/00* (2012.01)
*G06Q 50/02* (2012.01)

(52) U.S. Cl.
CPC .......... *G06Q 30/018* (2013.01); *G06Q 50/02* (2013.01)

(58) Field of Classification Search
None
See application file for complete search history.

(56) References Cited

U.S. PATENT DOCUMENTS

| | | | | |
|---|---|---|---|---|
| 5,845,255 A | * | 12/1998 | Mayaud | G06F 19/3456 705/3 |
| 7,519,540 B2 | * | 4/2009 | Mayaud | G06F 19/3456 705/2 |
| 8,560,338 B2 | * | 10/2013 | Kalies, Jr. | G06Q 30/00 700/236 |
| 2002/0007333 A1 | * | 1/2002 | Scolnik | G06Q 30/02 705/37 |

(Continued)

*Primary Examiner* — Sunit Pandya
(74) *Attorney, Agent, or Firm* — NK Patent Law

(57) ABSTRACT

The system electronically publishes the current Federal Drug Administration, Department of Health, and Department of Agriculture regulatory status of competing compounding centers and agriculture aggregators along with the price and availability of custom route, dosage form, and strength specific compounded formularies and agriculture aggregates. Through this system, a highly specific request is submitted to compounding centers and agriculture aggregators by licensed professionals on behalf of purchasers desiring to ascertain regulatory status, availability and pricing through the electronic system. The published price includes the question of current status and exact request, but may vary based on excipients used, commodity availability, and level of effort used to create the custom formulary or aggregate. The system delivers the regulatory status and the price, including delivery, for up to 10 facilities in the form of a list. Once a purchaser has reviewed the responses, the purchaser, along with the licensed professional may choose to use one provider from the list, or request another compound or aggregate that meets the needs of the purchaser.

14 Claims, 12 Drawing Sheets

(56) References Cited

U.S. PATENT DOCUMENTS

| | | | |
|---|---|---|---|
| 2005/0065821 A1* | 3/2005 | Kalies, Jr. | G06Q 30/02 |
| | | | 705/2 |
| 2010/0070298 A1* | 3/2010 | Kalies | G06Q 30/00 |
| | | | 705/2 |
| 2010/0121752 A1* | 5/2010 | Banigan | G06Q 40/00 |
| | | | 705/37 |
| 2013/0144649 A1* | 6/2013 | Kalies, Jr. | G06F 19/3475 |
| | | | 705/2 |

* cited by examiner

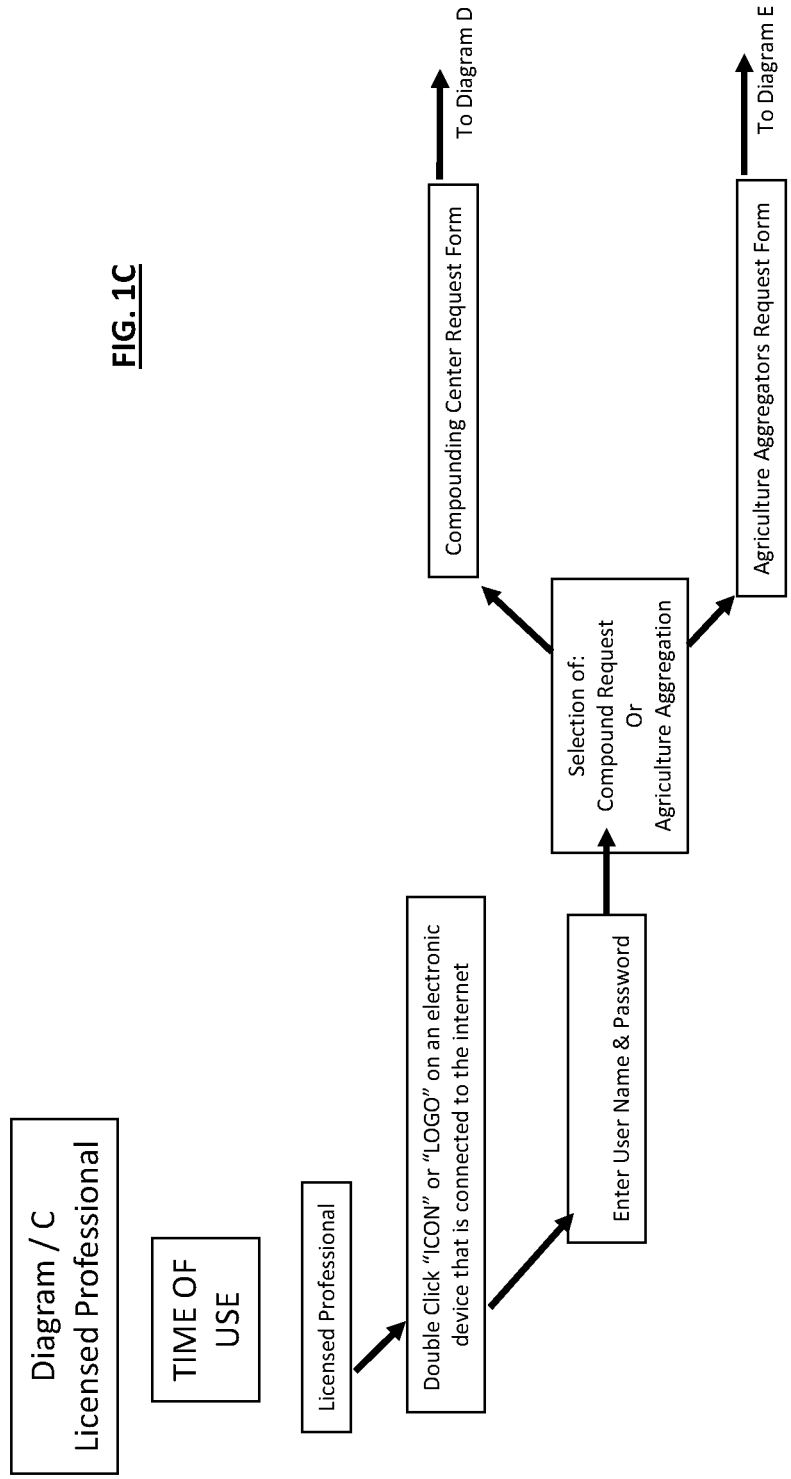

Diagram / D
Licensed Professional
COMPOUND REQUEST

RSDFF = Route Specific Dosage Form Formulary
FDA – Federal Drug Administration
DOH – Department of Health
DOA – Department of Agriculture

FIG. 1D

FROM DIAGRAM B

1. Statement of Medical Necessity selected and checked
2. Unique Compound Request Identification Number (auto-fill)
3. Compound Route of Administration selected from pre-populated list
4. Compound Dosage Form selected from pre-populated list
5. Compound Active Ingredient(s) selected from pre-populated list
6. Active Ingredient(s) Strength selected from pre-populated list
7. Compound Excipient Requests from pre-populated list (includes NONE as option)
8. Licensed Professional Notes entered into Request
9. Delivery Date Needed & Time Limit selected
10. Delivery Street Address, Zip Code entered
11. Purchaser Insurance Carrier selected from pre-populated list (Includes None as option)
12. Purchaser Insurance Carrier plan selected from pre-populated list (includes "none" as option)
13. Question selected - Is your facility currently FDA Approved?
14. Question selected – What is the total cost of the compound before insurance?
15. Question selected – Will your center file for benefits on behalf of the Purchaser?
16. Question selected – With the noted compound insurance plan what percent of your price is expected to be covered with benefits?
17. Question selected - Does your facility currently have a valid certificate from the Department of Health?
18. Question selected - Does your facility currently have a valid certificate from the Department of Agriculture?
19. Question selected – If purchased through you, do you agree to include and pay the (negotiated amount) management fee included in this price quote?
20. Submission Sent
21. Electronic Notification of Request Sent (Simple Notification)

To Diagram I

FIG. 1E

| Diagram / E | RSDFF = Route Specific Dosage Form Formulary |
| Licensed Professional | FDA – Federal Drug Administration |
| AGGREGATE REQUEST | DOH – Department of Health |
| | DOA – Department of Agriculture |

FROM DIAGRAM B

1. Statement of Medical Necessity selected and checked
2. Unique Compound Request Identification Number (auto-fill)
3. Agriculture Aggregate Route of Administration selected from pre-populated list
4. Agriculture Aggregate Dosage Form selected from pre-populated list
5. Agriculture Aggregate Active Ingredients selected from pre-populated list
6. Agriculture Aggregate Strength selected from pre-populated list
7. Agriculture Aggregate Excipient Requests from pre-populated list (includes NONE as option)
8. Licensed Professional Notes entered into Request
9. Delivery Date Needed & Time Limit selected
10. Delivery Street Address, zip code entered
11. Purchaser Prescription Insurance carrier selected from pre-populated list (Includes None as option)
12. Question selected - Is your facility currently FDA Approved?
13. Question selected – What is the total cost of the aggregate before insurance?
14. Question selected – Will your center file for benefits on behalf of the Purchaser?
15. Question selected – With the noted aggregate insurance, plan what percent of your price is expected to be covered with benefits?
16. Question selected - Does your facility currently have a valid certificate from the Department of Health?
17. Question selected - Does your facility currently have a valid certificate from the Department of Agriculture?
18. Question selected – If purchased through you, do you agree to include and pay the (negotiated amount) management fee included in this price quote?
19. Submission Sent
20. Electronic Notification of Request Sent (Simple Notification)

To Diagram H

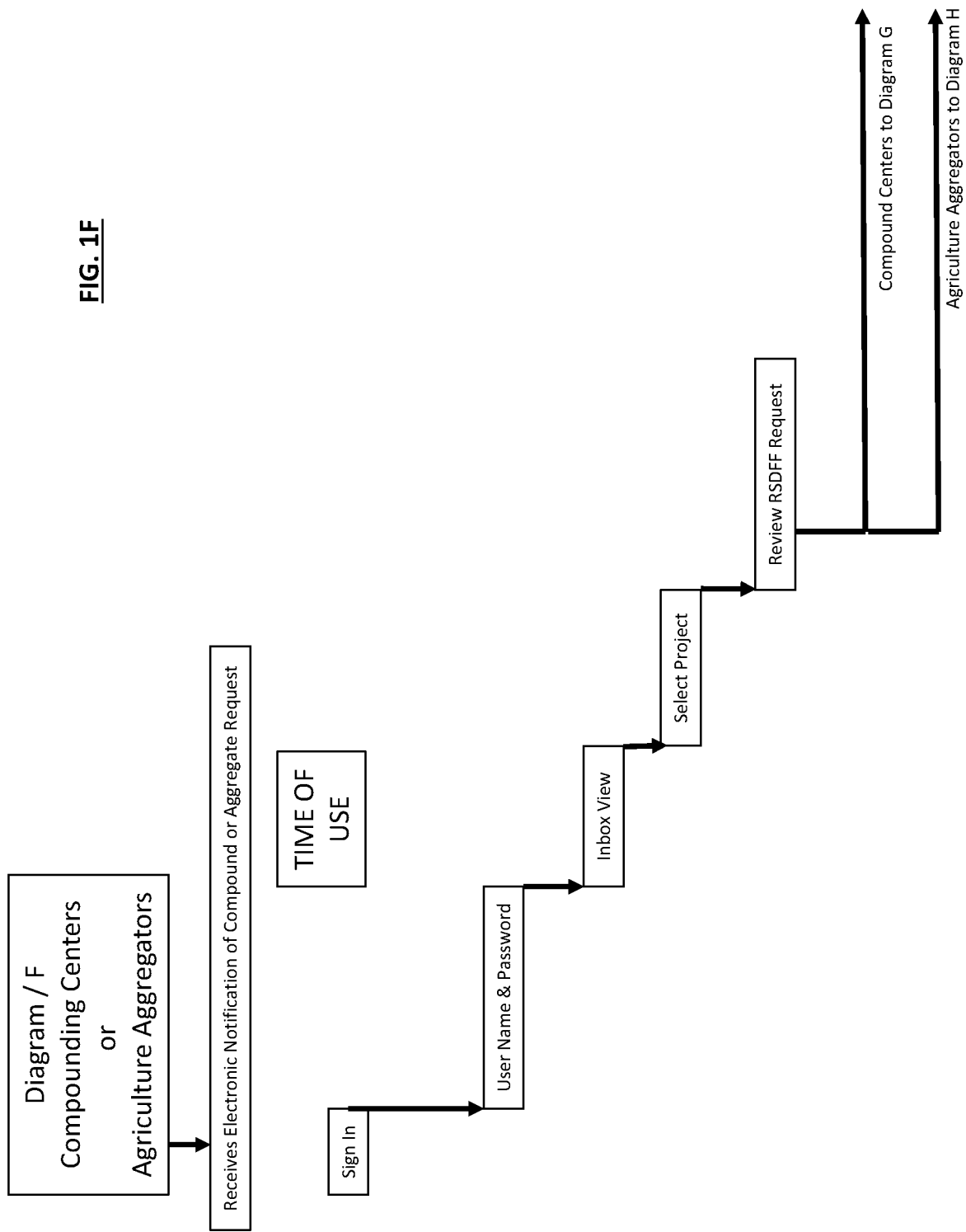

FIG. 1G

Diagram / G
Compounding Centers

RSDFF = Route Specific Dosage Form Formulary
FDA – Federal Drug Administration
DOH – Department of Health
DOA – Department of Agriculture Compounding Request VIEW 1. Statement of Medical Necessity appears
2. View Unique Compound Request Identification Number
3. View Compound Route of Administration and match with internal drop down list
4. View Compound Dosage Form and match with internal drop down box
5. View Compound Active Ingredients and match with internal drop down box that includes pricing
6. View Compound Strength and match with internal drop down list that includes pricing
7. View Compound Excipient Requests (if any)
8. View Licensed Professional Notes entered into Request
9. Add Compound Excipients (with pricing) needed to meet request
10. Add Level of Effort from pre-populated drop down box
11. Add Mark-up that ALWAYS includes RSDFF commodity search management fee from pre-populated drop down box
12. View Delivery Date Needed & Time Limit
13. View Delivery Street Address, zip code and match with drop down list that includes pricing
14. View Prescription Insurance carrier and match with pre-populated list that includes pricing
15. Answer Question - Is your facility currently FDA Approved? YES or NO
16. Answer Question – What is the total cost of the compound before insurance? Select populated amount or change manually
17. Answer Question – Will you file insurance for Purchaser if requested YES or NO
18. Answer Question – Has this compound insurance provider and plan paid benefits to your center in the past? YES or NO
19. Answer Question - Does your facility currently have a valid certificate from the Department of Health?
20. Answer Question - Does your facility currently have a valid certificate from the Department of Agriculture?
21. Answer Question – Do you agree to include and pay the (negotiated amount) management fee included in this price quote if purchased from your center?
22. Submission Sent
23. Electronic Notification of Request Sent (Simple Notification), and time stamped To Diagram I

FIG. 1H

Diagram / H
Agriculture Aggregators

RSDFF = Route Specific Dosage Form Formulary
FDA – Federal Drug Administration
DOH – Department of Health
DOA – Department of Agriculture Aggregate Request VIEW 1. Statement of Medical Necessity appears
2. View Unique Aggregate Request Identification Number
3. View Aggregate Route of Administration and match with internal drop down list
4. View Aggregate Dosage Form and match with internal drop down box
5. View Aggregate Active Ingredients and match with internal drop down box that includes pricing
6. View Aggregate Strength and match with internal drop down list that includes pricing
7. View Aggregate Excipient Requests (if any)
8. View Licensed Professional Notes entered into Request
9. Add Aggregate Excipients (with pricing) needed to meet request
10. Add Level of Effort from pre-populated drop down box
11. Add Mark-up that ALWAYS includes RSDFF commodity search management fee from pre-populated drop down box
12. View Delivery Date Needed & Time Limit
13. View Delivery Street Address, zip code and match with drop down list that includes pricing
14. View Prescription Insurance carrier and match with pre-populated list that includes pricing
15. Answer Question - Is your facility currently FDA Approved? YES or NO
16. Answer Question – What is the total cost of the aggregate before insurance? Select populated amount or change manually
17. Answer Question – Will you file insurance for Purchaser if requested YES or NO
18. Answer Question – Has this compound insurance provider and plan paid benefits to your center in the past? YES or NO
19. Answer Question - Does your facility currently have a valid certificate from the Department of Health?
20. Answer Question - Does your facility currently have a valid certificate from the Department of Agriculture?
21. Answer Question – Do you agree to include and pay the (negotiated amount) management fee included in this price quote if purchased from your center?
22. Submission Sent
23. Electronic Notification of Request Sent (Simple Notification), and time stamped To Diagram I

FIG. 1I

Diagram / I
Licensed Professional
FINAL

RSDFF = Route Specific Dosage Form Formulary
FDA – Federal Drug Administration
DOH – Department of Health
DOA – Department of Agriculture Response arrives back with Licensed Professional for review with Purchaser 1. Competitive Prices for exact RSDFF are published
2. FDA Approved? YES or NO Submitted HERE
3. Total cost of the compound/aggregate before insurance Submitted HERE
4. Answer to - Will you file insurance for Purchaser if requested? Submitted (YES or NO) HERE
5. Answer to - Has this compound insurance provider and plan paid benefits to your center in the past? Submitted (YES or NO) here
6. Answer to - Does your facility currently have a valid certificate from the Department of Health? Submitted (YES or NO) here
7. Answer to - Does your facility currently have a valid certificate from the Department of Agriculture? Submitted (YES or NO) here
8. Purchaser Selects Provider or choose a different RSDFF instead
9. Licensed Professional writes Prescription

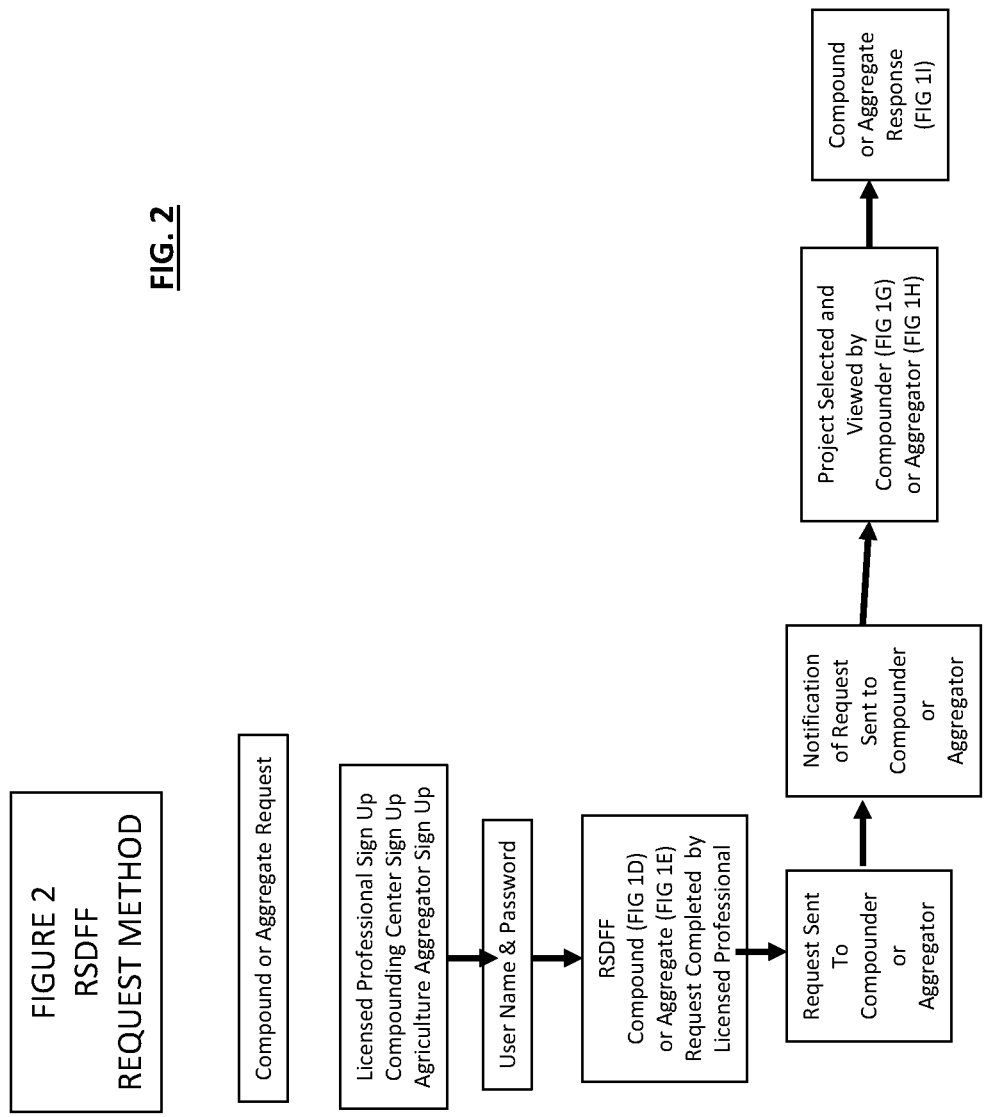

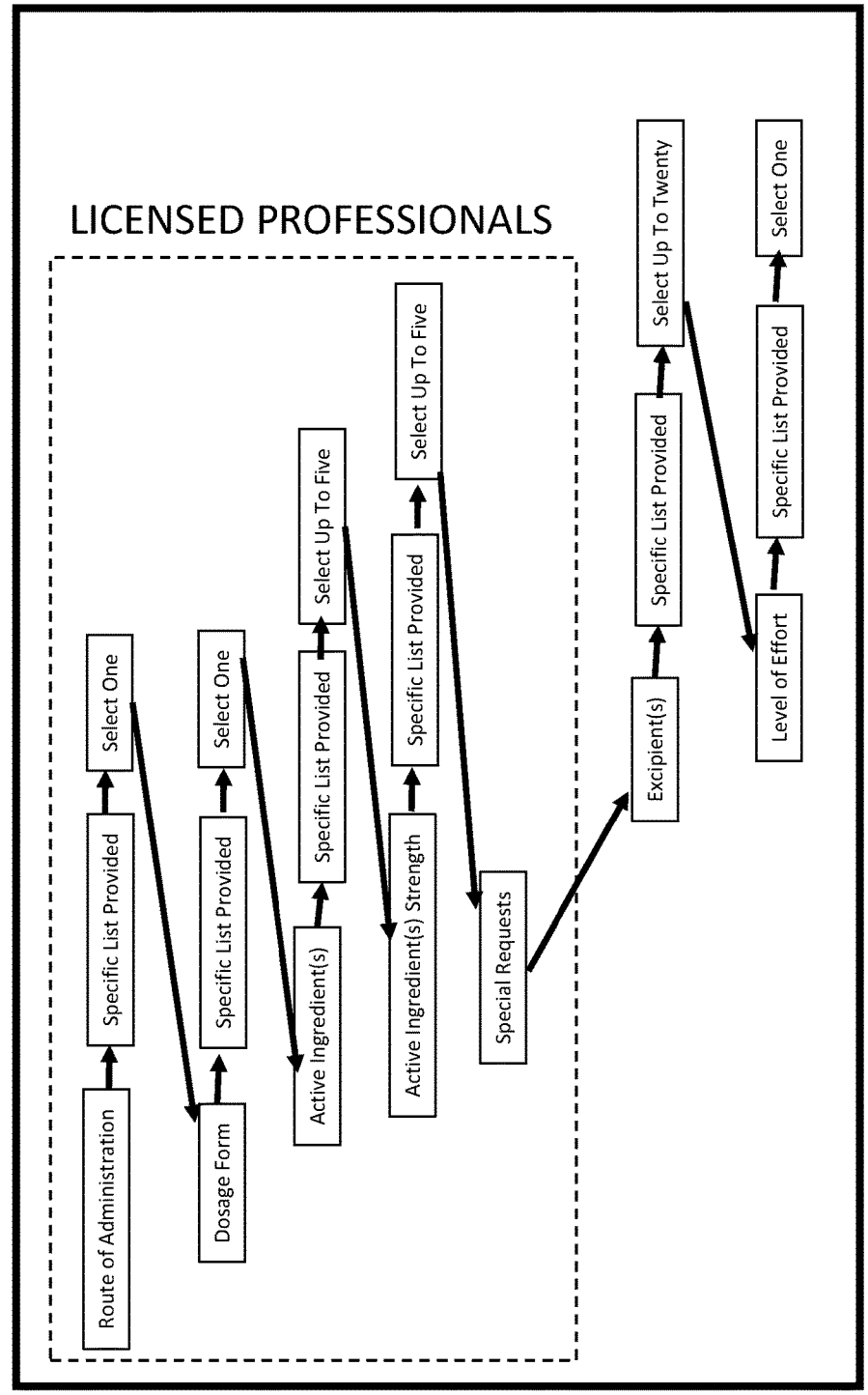

METHOD FOR COMPOUNDING CENTERS AND/OR AGRICULTURE AGGREGATORS TO PUBLISH CURRENT REGULATORY STATUS ALONGSIDE CUSTOMIZED ACTIVE INGREDIENT FORMULARY PRICING BASED ON ROUTE, DOSAGE FORM, AND STRENGTH SPECIFIC REQUESTS THAT INCLUDES EXCIPIENTS AND LEVEL OF EFFORT

CROSS REFERENCE TO RELATED APPLICATIONS

This application is a continuation of U.S. patent application Ser. No. 14/492,005 filed on Sep. 20, 2014 and entitled "METHOD FOR COMPOUNDING CENTERS AND/OR AGRICULTURE AGGREGATORS TO PUBLISH CURRENT REGULATORY STATUS ALONGSIDE CUSTOMIZED ACTIVE INGREDIENT FORMULARY PRICING BASED ON ROUTE, DOSAGE FORM, AND STRENGTH SPECIFIC REQUESTS THAT INCLUDES EXCIPIENTS AND LEVEL OF EFFORT", which is incorporated by reference herein in its entirety.

FIELD

This invention relates to a software method for compounding centers and/or agriculture aggregators to publish their current regulatory status alongside current, real time pricing of route, dosage form, and strength specific active ingredient compounded or aggregated formularies with the necessary excipients and level of effort to complete the inquiry. Compounding is typically used for small batch or individual purchaser production because they are not only customized for the purchaser, but they also have a short term expiration date regarding efficacy. Agriculture Aggregators use aggregation techniques to prepare plants for customized use by purchasers. Agriculture aggregates also have an expiration date, but it is longer period of time than traditional compounds. Within the scope of this method, compounding and agriculture aggregation are in the same field when requested by a licensed professional. Specifically, the invention relates to a method of providing purchasers with each participating provider's current government regulatory status, and one price for the requested route, dosage form, and strength specific active ingredient compound or aggregate formulary that includes level of effort and any or all excipients used to create it. Each published price includes the aforementioned and a formulary statement of accuracy for a purchaser's consideration prior to an actual compound or aggregate prescription being written to fulfill the formulary or aggregate request.

BACKGROUND

Due to the intricate, customized details and expiration dates regarding efficacy, an ease of use method for Compounding Centers or Agriculture Aggregators wanting to publishing real time pricing prior to a written prescription did not exist. Therefore, there was no way to provide purchasers and licensed professionals with fulfillment options to meet a need. Since not all Compounding Centers and/or Agriculture Aggregators are currently regulated by the Federal Drug Administration or compliant with Department of Agriculture and/or Department of Health regulations at the time of compound or aggregate request, this method provides a purchaser with the option to see the published price of the highly customized formulary alongside the current regulatory status. The method also provides a platform for the provider to include level of effort, including excipients used, which represents the professional time/effort for compounding or aggregating the route, dosage form, and strength specific active ingredient formulary pricing. Two factors help the licensed professional and the purchases decide whether or not to write a prescription for a particular compound or aggregate. Those two measure are both a price that includes delivery to a specific location on a specific date and a statement of current government regulatory status.

Route, dosage form, and strength specific active ingredient compound and aggregate formularies are created individually based on a person or animal's specific need as it relates to absorption, known or perceived reaction, and/or preferences. An initially suggested compound or aggregate may prove to be cost prohibitive to the purchaser or the cost may be in line, but the provider that cannot meet the request within budget and on time, may not be regulated to the personal standards of the purchaser. This method allows the provider and licensed professional evaluate the first recommendation and to look for alternatives in real time if necessary. This is a new software method of use.

Compounding formularies and aggregated agriculture are custom made at the time of order based on specific route of administration, dosage form, active ingredients, strength of the active ingredients, excipients and level of effort. Available formulary contents, accessible commodities, dosage form and level of effort are the primary factors in publishing a price for the deliverable. Since not all compounding centers and agriculture aggregators are regulated, the customer will decide if the price, along with the current regulatory status of the provider's price, up to and including the risk of a non-regulated provider, warrants consideration at the published price from a specific provider. Once a selection has been made, a written prescription may be generated.

Purchaser information and/or ability to pay is not part of the method and is never a determining factor in the outcome. Instead, the method pertains specifically to published pricing of a route, dosage form, and strength specific active ingredient formularies using available resources, excipients and commodities including delivery to a specific location on a specific day. The method provides a fully integrated software system that makes the inquiry more efficient for all users and providers.

Compounding Centers and Agriculture Aggregators fulfill customized route specific, dosage form, and strength specific active ingredient formularies for humans and animals as requested by a person with a professional license who is allowed by law to recommend a route specific, dosage form, and strength specific active ingredient formulary or agriculture aggregate. This method allows an efficient model to not only evaluate the formulary, but also publish a price prior to a written prescription being generated.

SUMMARY

The present invention is a tool which allows purchasers to obtain route, dosage form, and strength specific active ingredient formulary pricing and relevant regulatory information prior to a receiving prescription. This new method for communicating the formulary price and regulatory information gives a purchaser the opportunity to select a formulary based on four independent factors including, but not limited to route, dosage form, and strength specific active ingredient formulary availability, price, provider regulatory status and date of delivery. The method is a software tool by which a licensed professional authorized by law can efficiently request route, dosage form, and strength specific active ingredient formularies and is authorized by method inventor to use the method to inform a purchaser of compound or aggregate options prior to writing a prescription. If the original formulary request does not meet the wants or needs of the purchaser, other formularies may be requested, in real time, until the licensed professional and purchaser are mutually satisfied with the custom formulary choice prior to writing a prescription.

In one embodiment, the invention is a software method for facilitating the request and delivery of information relating to the availability of a route, dosage form, and strength specific active ingredient formulary.

In another embodiment, the invention is a method for facilitating the delivery of information relating to the government regulatory status of Compounding Center or Agriculture Aggregator including, but not limited to Federal Drug Administration, Department of Agriculture and/or the Department of Health.

In a further embodiment, the invention is a method for providing a system that allows exchange of information regarding specific routes for administration, compound or aggregate dosage form, compound or aggregate restrictions, active ingredients, active ingredient strength, excipients, level of effort and specific delivery due date and location.

In yet another embodiment, the invention is a method for immediately publishing pricing for custom formularies by both regulated and non-regulated Compounding Centers and Agriculture Aggregators prior to a prescription.

In yet another embodiment, the invention is a method for providing licensed professionals with empirical data that could alter or improve the custom compound or aggregate formulary prior to writing a prescription.

In yet another embodiment, the invention is an ease of use method for providing providers with a system to import route of administration, dosage form, and strength of active ingredient formulary requests from licensed professionals, then adding excipients and level of effort to create immediate pricing within the primary software system that operates in all communication forms including, but not limited to, electronic.

BRIEF DESCRIPTION OF THE DRAWINGS

There are no additional features of the inventive embodiment as this invention pertains specifically to Compounding Centers and/or Agriculture Aggregation.

FIG. 1A-I is a flow diagram of a method for outlining the registration of the licensed professionals and providers and the method by which they communicate specific requirements of the request.

FIG. 2 summarizes the compound or aggregate request method.

FIG. 3 demonstrates the variables that impact pricing of the compound or aggregate.

DETAILED DESCRIPTION

Figure 1A:
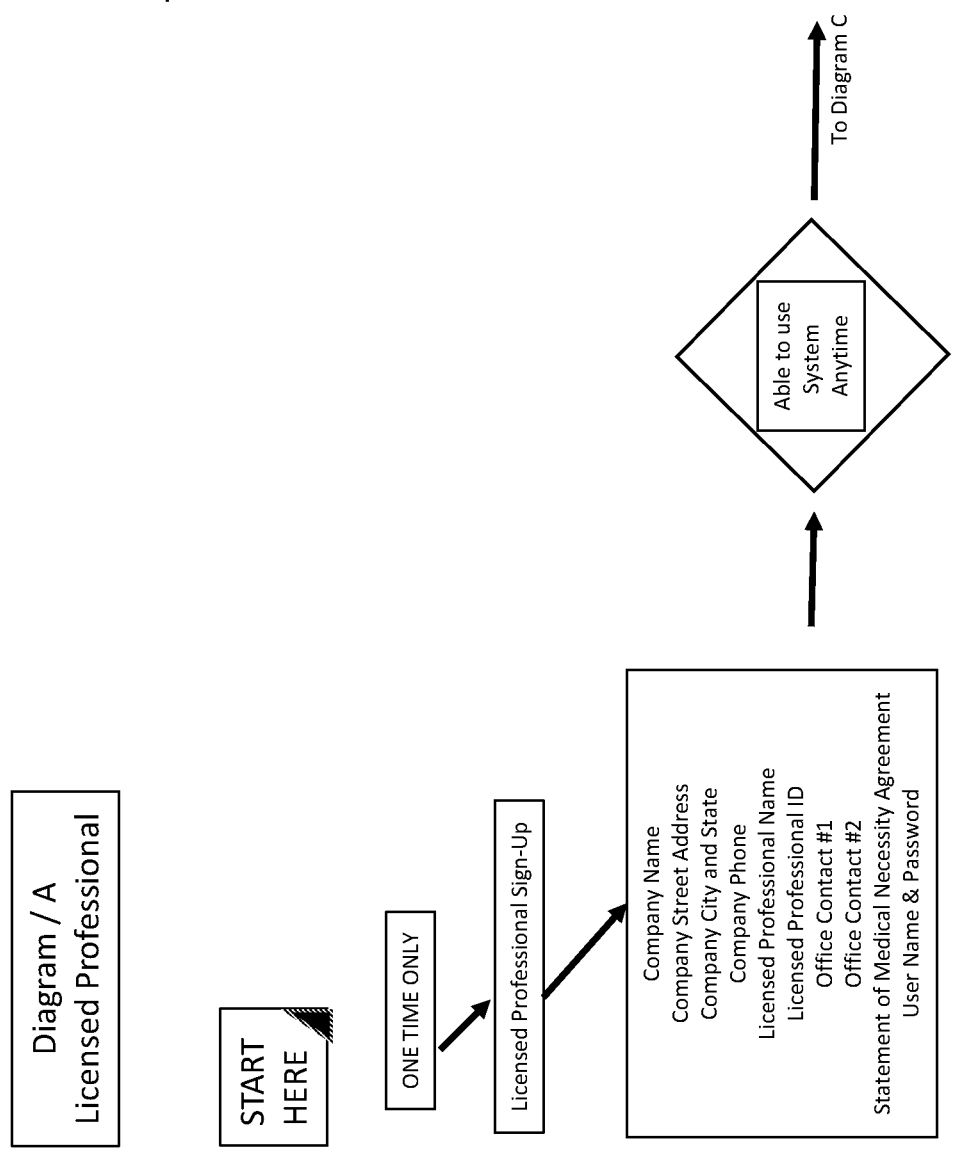

As used herein, the term "route specific" used in the method refers to any order by a licensed professional that specifically describes the route of administration by which active ingredient absorption will take including, but limited to inhalation, irrigation, dental route, gastroenteral route, hemodialysis route, infusion route, injection route, intra-arterial route, intramuscular route, Intrathecal route, intravenous piggyback route, intravenous push route, intravenous route, nasal route, ophthalmic route, oral route, oromucosal route, otic route, per rectum (route), per vagina, peritoneal dialysis route, subcutaneous route, sublingual route, topical route, and/or transdermal route for a compound or aggregate.

As used herein, the term "dosage form" in the method refers to any order by a licensed professional that specifically describes the organic "container" that embodies the order including, but not limited to a capsule, which is a soluble dispensable unit enclosing a single dose of a medication or combination of medications; cream, which is a soft solid or thick liquid containing medication, applied externally for a prophylactic, therapeutic, or cosmetic purpose; edibles, which is generally prepared by cooking in butter or vegetable oil; elixir, which is a clear, sweetened, usually hydroalcoholic liquid containing flavoring substance and one or more medications; emulsion, a mixture of two immiscible liquids, one being dispersed throughout the other in small droplets; enema, which is a liquid preparation intended for introduction into the rectum containing one or more medications; a liquid which is a substance that flows readily in its natural state; lotion, which is a liquid suspension for external application to the body; lozenge, which is a solid, single dispensable unit containing one or more medications intended for dissolution in the mouth; oil which is semisolid preparation, used a vehicle for medication that can be applied externally or ingested; ointment which is a semisolid preparation, used as a vehicle for medication and applied externally to the body; powder, which is finely ground particles of a solid medication; resin, which has wax like consistency; shampoo which is a liquid preparation (solution, suspension, emulsion) for external application to the scalp; solution which is a homogenous mixture of one or more liquids; suppository, which is a dispensable unit containing a single dose of medication or combination of medications to be introduced into a body orifice, such as the rectum, urethra, or vagina; suspension, which is a reparation of a powdered form of a drug incorporated into a suitable liquid vehicle; syrup, which is a concentrated solution of a sugar in water or other aqueous liquid and one or more medications; tea, which is dry leaves and stems steeped in hot water; tinctures, which is a liquid strained from leaves soaked in alcohol; tobacco, which is dried leaves; tablet, which is a single dispensable unit containing one or more medications, with or without a suitable diluent; or a troche which is a small tablet or lozenge, usually a circular one, made of medicinal substance worked into a paste with sugar and mucilage or the like, and dried; or vapor which is medication in the form of a gas.

As used herein; "excipient" refers to a natural or synthetic substance formulated alongside the active ingredients of a medication included for the purpose of bulking-up formulations that contain potent active ingredients or to confer a therapeutic enhancement on the active ingredient in the final dosage form, such as facilitating drug absorption or solubility. Excipients can also be useful in the manufacturing process, to aid in the handling of the active substance concerned such as by facilitating powder flow ability or non-stick properties, in addition to aiding in vitro stability such as prevention of denaturation over the expected shelf life. The selection of appropriate excipients depends upon the route of administration and the dosage form, as well as the active ingredients and other factors. Though excipients were at one time considered to be "inactive" ingredients, they are now understood to be a key determinant of dosage form performance.

Pharmaceutical regulations and standards require that all ingredients in drugs, as well as their chemical decomposition products, be identified and shown to be safe. Often, more excipient is found in a final drug formulation than active ingredient, and practically all compounded drugs and/or agricultural aggregates contain excipients.

Specific type of excipients in the method include, but are not limited to: 1.1 Antiadherents, 1.2 Binders 1.3 Coatings, 1.4 Disintegrants, 1.5 Fillers, 1.6 Micro-dosing 1.7 Flavors, 1.8 Colors, 1.9 Lubricants, 1.10 Glidants, 1.11 Sorbents, 1.12 Preservatives, and 1.13 Sweeteners.

1.1 Antiadherents are used to reduce the adhesion between the powder (granules) and the punch faces and thus prevent sticking to tablet punches. They are also used to help protect tablets from sticking.

1.2 Binders hold the ingredients together. Binders ensure that tablets and granules can be formed with required mechanical strength, and give volume to low active dose tablets. Binders are usually: saccharides and their derivatives; disaccharides: sucrose, lactose; polysaccharides and their derivatives; starches, cellulose or modified cellulose such as microcrystalline cellulose and cellulose ethers such as hydroxypropyl cellulose (HPC); Sugar alcohols such as xylitol, sorbitol or maltitol; Protein; gelatin; Synthetic polymers: polyvinylpyrrolidone (PVP), and polyethylene glycol (PEG).

Binders are classified according to their application: Solution binders are dissolved in a solvent (for example water or alcohol can be used in wet granulation processes). Examples include gelatin, cellulose, cellulose derivatives, polyvinylpyrrolidone, starch, sucrose and polyethylene glycol.

Dry binders are added to the powder blend, either after a wet granulation step, or as part of a direct powder compression (DC) formula. Examples include cellulose, methyl cellulose, polyvinylpyrrolidone and polyethylene glycol.

1.3 Coatings include, but are not limited to tablet coatings protect tablet ingredients from deterioration by moisture in the air and make large or unpleasant-tasting tablets easier to swallow. For most coated tablets, a cellulose ether hydroxypropyl methylcellulose (HPMC) film coating is used which is free of sugar and potential allergens. Occasionally, other coating materials are used, for example synthetic polymers, shellac, corn protein zein or other polysaccharides. Capsules are coated with gelatin. Enterics control the rate of drug release and determine where the drug will be released in the digestive tract. Materials used for enteric coatings include fatty acids, waxes, shellac, plastics, and plant fibers.

1.4 Disintegrants expand and dissolve when wet causing the tablet to break apart in the digestive tract, releasing the active ingredients for absorption. They ensure that when the tablet is in contact with water, it rapidly breaks down into smaller fragments, facilitating dissolution. Examples of disintegrants include, but are not limited to crosslinked polymers: crosslinked polyvinylpyrrolidone (crospovidone), crosslinked sodium carboxymethyl cellulose (croscarmellose sodium). The modified starch sodium starch glycolate.

1.5 Fillers are also referred to as "bulking agents" or "diluents." Fillers add volume and/or mass to a drug substance, thereby facilitating precise metering and handling thereof in the preparation of dosage forms. Fillers typically also fill out the size of a tablet or capsule, making it practical to produce and convenient for the consumer to use. A good filler is typically be inert, compatible with the other components of the formulation, non-hygroscopic, relatively cheap, compactible, and preferably tasteless or pleasant tasting. Plant cellulose (pure plant filler) is a popular filler in tablets or hard gelatin capsules. Dibasic calcium phosphate is another popular tablet filler. A range of vegetable fats and oils can be used in soft gelatin capsules. Other examples of fillers include: lactose, sucrose, glucose, mannitol, sorbitol, calcium carbonate, and magnesium stearate. Sometimes other noted kinds of excipients are in effect doubling in function as fillers.

1.6 Micro-dosing is a technologies that enabling small-scale production of drug products without the need for fillers (or any excipient, if desired—and if otherwise acceptable), due to its ability to handle and measure out appropriate quantities without bulking/dilution. Such technologies exist for dispensing both solid and non-solid substances.

1.7 Flavors can be used to mask unpleasant tasting active ingredients and improve the acceptance that the purchase will complete a course of medication. Flavorings may be natural (e.g. fruit extract) or artificial. For example, to improve a bitter product—mint, cherry or anise may be used; a salty product—peach, apricot or liquorice may be used; a sour product—raspberry or liquorice may be used; an excessively sweet product—vanilla may be used 1.8 Colors are added to improve the appearance of a formulation. Color consistency is important as it allows easy identification of a compound of aggregate.

1.9 Lubricants prevent ingredients from clumping together and from sticking to the tablet punches or capsule filling machine. Lubricants also ensure that tablet formation and ejection can occur with low friction between the solid and die wall. Common minerals like talc or silica, and fats, e.g. vegetable stearin, magnesium stearate or stearic acid are the most frequently used lubricants in tablets or hard gelatin capsules. Lubricants are agents added in small quantities to tablet and capsule formulations to improve certain processing characteristics.

There are three roles identified with lubricants as follows: (1) True lubricant role: to decrease friction at the interface between a tablet's surface and the die wall during ejection and reduce wear on punches & dies. (2) The anti-adherent role: prevent sticking to punch faces or in the case of encapsulation, lubricants prevent sticking to machine dosators, tamping pins, etc. (3) Glidant role: Enhance product flow by reducing interparticulate friction.

There are two major types of lubricants: (1) Hydrophilic have no glidant or anti-adherent properties. (2) Hydrophobic are the most widely used lubricants in use today are of the hydrophobic category. Examples include magnesium stearate.

1.10 Glidants are used to promote powder flow by reducing interparticle friction and cohesion. These are used in combination with lubricants as they have no ability to reduce die wall friction. Examples include fumed silica, talc, and magnesium carbonate.

1.11 Sorbents are used for tablet/capsule moisture-proofing by limited fluid sorbing (taking up of a liquid or a gas either by adsorption or by absorption) in a dry state.

1.12 Preservatives used in pharmaceutical formulations are antioxidants like vitamin A, vitamin E, vitamin C, retinyl palmitate, and selenium The amino acids cysteine and methionine Citric acid and sodium citrate[disambiguation needed] Synthetic preservatives like the parabens: methyl paraben and propyl paraben.

1.13 Sweeteners are added to make the ingredients more palatable, especially in chewable tablets such as antacid or liquids like cough syrup. Sugar can be used to mask unpleasant tastes or smells.

As used herein; "level of effort" refers to the work associated with preparing the compound or aggregate including, but not limited to five (5) unique compound groups and five (5) agriculture aggregates. Compound Group (1) one is single ingredient batched capsule, any combination of commercially available products (commercial product example—#00 PURPLE/WHITE CAPSULES). Compound Group (2) two is two or three ingredient batched capsule or transdermal gel; Compound Group (3) three is four or more ingredient batched capsule, three or less ingredient cream/ointment/gel or three or less ingredient capsule or suppository or two or less ingredient troche noncomplex suspension tablet triturate. Compound Group (4) Four is topical containing controlled ingredients, three or more ingredient troche, four or more ingredient cream/ointment/gel, four of more Ingredient capsule, complex suspensions (e.g., pediatric), custom capsule (includes rapid dissolution preparations) chemotherapy cream/ointment/gel, hormone therapy (capsules, troches, and suppositories). Compound Group (5) Five is a Sterile Product. Agriculture Aggregate Group (1) one is edibles. Agriculture Aggregate Group (2) is resin or oil. Agriculture Aggregate Group (3) Three is tea. Agriculture Aggregate Group (4) Four is a tincture. Agriculture Aggregate Group (5) Five is tobacco. Identity of a group defines the "level of effort" is part of the method used to create the final utility.

A compounding center refers to a facility with has the means to create compounds using the art and science of preparing personalized medications for humans and animals. Compounds are individual active ingredients are that combined with excipients to create the exact route of administration, strength and dosage form requested by a licensed professional. This method allows the compounding centers to publish current pricing of the compound process.

An agriculture aggregator refers to a facility with the means to create aggregates using the art and science of preparing personalized medications for humans and animals from plants. Aggregates are agriculture ingredients that focus more on combining level of effort with the exact route of administration, strength and dosage form requested by a licensed professional. Excipients are used with agriculture aggregation, but not as often as compounds. This method allows the agriculture aggregators to publish current pricing of the agriculture and aggregation process.

Government regulatory status refers to the current recognition by governing bodies. These governing bodies include, but are not limited to the Federal Drug Administration, the Department of Health and/or the Department of Agriculture. Providers must not only demonstrate their status, they must legally announce to their current status with each and every transaction.

A licensed professional is the person recommending a particular compound or aggregate for the purpose of use by a human or animal. Based on availability and pricing the licensed professional and the purchaser will determine which course of action best meets the required needs. A purchaser is a person who buys a compound or aggregate. A provider is a compounding center or agriculture aggregator.

According to the present invention, a method is disclosed whereby a licensed professional uses the said invention as a template to accurately describe the formulary that is under review. The request includes route of administration, dosage form, active ingredient(s), active ingredient strength, professional notes, delivery date and address for the compound or aggregate along with the current status of government regulation are requested are transmitted electronically with a specific deadline (Fifteen minutes or less) to a relevant group of compounding centers or agriculture aggregators.

FIG. 1A is demonstrates the first time a Licensed Professional uses the system, a one-time registration is required and can be entered in any order. Diagramed steps for the Licensed Professional are the entry of: Company Name, Company Street Address, Company City, State, Company Phone, Licensed Professional Name, Licensed Professional ID, Office Contact #1, Office Contact #2, Statement of Medical Necessity Agreement, and User Name & Password.

Figure 1B:
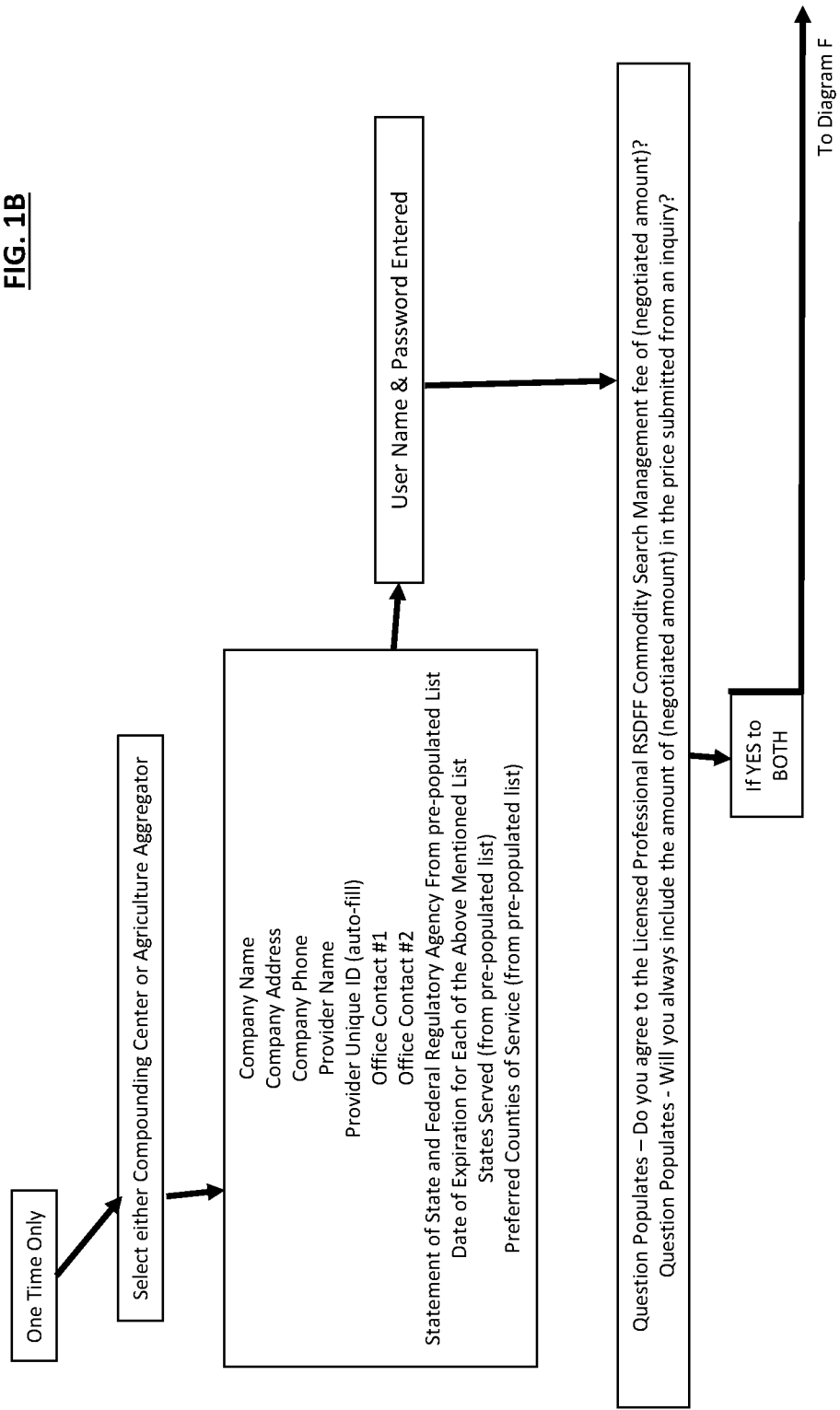

FIG. 1B demonstrates the first time a Provider uses the system, a one-time registration is required. Step 1 for the provider in this figure is to select the type of provider they choose to enter choosing either Compounding Center or Agriculture Aggregator. Step 1 in FIG. 1B is required as a first step in this portion of the method. Once Step 1 has been completed, the entry of the remaining steps of FIG. 1B is universally the same process for both Compounding Centers and Agriculture Aggregators and may be collected in any sequence. The method requires and diagram demonstration include: Company Name, Company Address, Company Phone, Provider Name, Provider Unique ID (auto-fill), Office Contact #1, Office Contact #2, Statement of State and Federal Regulatory Agency From pre-populated List, Date of Expiration for Each of the Above Mentioned List, States Served (from pre-populated list), Preferred Counties of Service (from pre-populated list)

Once this required information is entered and captured, in any sequence, the provider moves to step 3 and will select their user name and password.

Step 4 in FIG. 1B requires the answer of yes to two questions that can appear in any order. The two questions are, "Do you agree to the Licensed Professional RSDFF Commodity Search Management fee of (negotiated amount)" and, "will you always include the amount of (negotiated amount) in the price submitted from an inquiry?" If the answer is yes, the provider may respond to a specific Licensed Professional request upon notification that a request has arrived in the provider inbox.

FIG. 1C demonstrates the ease of use method to enter a request into the new system. Double click of an ICON or LOGO on an electronic screen automatically reveals space and a prompt for a user name, then password. Once recognized as a registered user, the Licensed Professional must now select the type of provider request they are looking for which is either compound or agriculture aggregate. The selection determines the next step as either FIG. 1 D or FIG. 1 E.

FIG. 1 D is the process by which the Licensed Professional requests a route and dosage form specific formulary from a Compound Center. While the steps are currently demonstrated in a particular order, for the purpose of the utility method, any of the first 19 steps can be entered in any sequence. Only step 20, the transmission of the request, is required as the last step of the request. Step 21 is a function of the completion of the step 20, which is the automatic electronic notification to providers that the 19 required steps have been completed.

The non-sequential steps that need to be completed (required) are as follows:
1. Statement of Medical Necessity selected and checked
2. Unique Compound Request Identification Number (auto-fill)
3. Compound Route of Administration selected from pre-populated list
4. Compound Dosage Form selected from pre-populated list 5. Compound Active Ingredient(s) selected from pre-populated list
6. Active Ingredient(s) Strength selected from pre-populated list
7. Compound Excipient Requests from pre-populated list (includes NONE as option)
8. Licensed Professional Notes entered into Request
9. Delivery Date Needed & Time Limit selected
10. Delivery Street Address, Zip Code entered
11. Purchaser Insurance Carrier selected from pre-populated list (Includes None as option)
12. Purchaser Insurance Carrier plan selected from pre-populated list (includes "none" as option)
13. Question selected—Is your facility currently FDA Approved?
14. Question selected—What is the total cost of the compound before insurance?
15. Question selected—Will your center file for benefits on behalf of the Purchaser?
16. Question selected—With the noted compound insurance plan what percent of your price is expected to be covered with benefits?
17. Question selected—Does your facility currently have a valid certificate from the Department of Health?
18. Question selected—Does your facility currently have a valid certificate from the Department of Agriculture?
19. Question selected—If purchased through you, do you agree to include and pay the (negotiated amount) management fee included in this price quote?
20. Submission of completed request
21. Electronic Notification of Request Sent (Simple Notification)

FIG. 1 E is the process by which the Licensed Professional requests a route and dosage form specific formulary from an agriculture aggregator. While the steps are currently demonstrated in a particular order, any of the first 18 steps can be entered in any sequence. Only step 19, the transmission of the request, is required as the last step of the request. Step 20 is a function of the completion of the 19 previous steps, which is the notification is automatically sent to providers that all steps have been completed.

1. The non-sequential steps that need to be completed are as follows:
2. Statement of Medical Necessity selected and checked
3. Unique Compound Request Identification Number (auto-fill)
4. Agriculture Aggregate Route of Administration selected from pre-populated list
5. Agriculture Aggregate Dosage Form selected from pre-populated list
6. Agriculture Aggregate Active Ingredients selected from pre-populated list
7. Agriculture Aggregate Strength selected from pre-populated list
8. Agriculture Aggregate Excipient Requests from pre-populated list (includes NONE as option)
9. Licensed Professional Notes entered into Request
10. Delivery Date Needed & Time Limit selected
11. Delivery Street Address, zip code entered
12. Purchaser Prescription Insurance carrier selected from pre-populated list (Includes None as option)
13. Question selected—Is your facility currently FDA Approved?
14. Question selected—What is the total cost of the aggregate before insurance?
15. Question selected—Will your center file for benefits on behalf of the Purchaser?
16. Question selected—With the noted aggregate insurance, plan what percent of your price is expected to be covered with benefits?
17. Question selected—Does your facility currently have a valid certificate from the Department of Health?
18. Question selected—Does your facility currently have a valid certificate from the Department of Agriculture?
19. Question selected—If purchased through you, do you agree to include and pay the (negotiated amount) management fee included in this price quote?
20. Submission Sent
21. Electronic Notification of Request Sent (Simple Notification)

FIG. 1F demonstrates the notification action that happens and follows. For compounders, this figure is a function of step 21 meaning that a notification request has been sent. For aggregators, this figure is a function of step 20 meaning that a notification request has been sent. Once the notification is received by either a compound center or agriculture aggregator, that particular provider has the option to sign into their unique inbox and review the request or not. Should the compounder or aggregator choose to respond, compounders are automatically directed to FIG. 1G and aggregators to FIG. 1H.

FIG. 1G is the method view for Compounding Centers. Steps 1-21 can be viewed and answered in any sequence. The method simply shows a sequence. Step 22, submission, requires that the previous 21 steps be completed in any order. Step 23 is a function of completing step 22. Step 23 is the automatic electronic notification and time stamp back to the licensed professional regarding availability and pricing.

FIG. 1G is the view of the order by Compounding Centers and includes:

1. Statement of Medical Necessity appears
2. View Unique Compound Request Identification Number
3. View Compound Route of Administration and match with internal drop down list
4. View Compound Dosage Form and match with internal drop down box
5. View Compound Active Ingredients and match with internal drop down box that includes pricing
6. View Compound Strength and match with internal drop down list that includes pricing
7. View Compound Excipient Requests (if any)
8. View Licensed Professional Notes entered into Request
9. Add Compound Excipients (with pricing) needed to meet request
10. Add Level of Effort from pre-populated drop down box
11. Add Mark-up that ALWAYS includes RSDFF commodity search management fee from pre-populated drop down box
12. View Delivery Date Needed & Time Limit
13. View Delivery Street Address, zip code and match with drop down list that includes pricing
14. View Prescription Insurance carrier and match with pre-populated list that includes pricing
15. Answer Question—Is your facility currently FDA Approved? YES or NO
16. Answer Question—What is the total cost of the compound before insurance? Select populated amount or change manually
17. Answer Question—Will you file insurance for Purchaser if requested YES or NO 18. Answer Question—Has this compound insurance provider and plan paid benefits to your center in the past? YES or NO
19. Answer Question—Does your facility currently have a valid certificate from the Department of Health?
20. Answer Question—Does your facility currently have a valid certificate from the Department of Agriculture?
21. Answer Question—Do you agree to include and pay the (negotiated amount) management fee included in this price quote if purchased from your center?
22. Submission Sent
23. Electronic Notification of Request Sent (Simple Notification), and time stamped FIG. 1H is the method view for Agriculture Aggregators. Steps 1-21 can be viewed and answered in any sequence. The method simply shows a preferable sequence. Step 22, submission, requires that the previous 21 steps be completed in any order. Step 23 is a function of completing step 22. Step 23 is the notification and times stamp back to the licensed professional regarding availability and pricing.

FIG. 1H is the view of the order by Agriculture Aggregators and includes:
1. Statement of Medical Necessity appears
2. View Unique Aggregate Request Identification Number
3. View Aggregate Route of Administration and match with internal drop down list
4. View Aggregate Dosage Form and match with internal drop down box
5. View Aggregate Active Ingredients and match with internal drop down box that includes pricing
6. View Aggregate Strength and match with internal drop down list that includes pricing
7. View Aggregate Excipient Requests (if any)
8. View Licensed Professional Notes entered into Request
9. Add Aggregate Excipients (with pricing) needed to meet request
10. Add Level of Effort from pre-populated drop down box
11. Add Mark-up that ALWAYS includes RSDFF commodity search management fee from pre-populated drop down box
12. View Delivery Date Needed & Time Limit
13. View Delivery Street Address, zip code and match with drop down list that includes pricing
14. View Prescription Insurance carrier and match with pre-populated list that includes pricing
15. Answer Question—Is your facility currently FDA Approved? YES or NO
16. Answer Question—What is the total cost of the aggregate before insurance? Select populated amount or change manually
17. Answer Question—Will you file insurance for Purchaser if requested YES or NO
18. Answer Question—Has this compound insurance provider and plan paid benefits to your center in the past? YES or NO
19. Answer Question—Does your facility currently have a valid certificate from the Department of Health?
20. Answer Question—Does your facility currently have a valid certificate from the Department of Agriculture?
21. Answer Question—Do you agree to include and pay the (negotiated amount) management fee included in this price quote purchased from your center?
22. Submission Sent
23. Electronic Notification of Request Sent (Simple FIG. 1I demonstrates the final outcome of the method. The response returns to the Licensed Professional for review with the purchaser. At that time, a decision can made to resubmit a new request or for the Licensed Professional to write a prescription. Responses 1-7 can arrive for review in any sequence. Any single response or combined number of responses can be used to determine step 8 or step 9. The method provides relevant information for decisions to be made regarding a prescription for a particular compound or aggregate.

FIG. 2 summarizes the compound or aggregate request method. Licensed Professionals (FIG. 1A) and Providers (FIG. 1B) wishing to use the method of communication engage in a one-time sign process.

Each will use unique user name and password to engage the system. The RSDFF Compound (FIG. 1D) or Aggregate (FIG. 1E) is entered and sent to the provider. The provider is notified of the request and may choose to view the request. If the provider choose to respond (FIG. 1I), the response is then sent back to the Licensed Professional for evaluation with the Purchaser.

FIG. 3 demonstrates the variables that impact pricing of the compound or aggregate. As long as Route of Administration, Dosage Form, Active ingredients, Active Ingredients strength, and special requests are entered, they can be entered in any order. This method claims all sequence combinations in this utility patent. Traditionally, excipients and level of effort are added by the providers and the diagram shows all of the variables. These variables work, and provide the same outcome in any sequence combination and the utility patent method claims all sequence combinations of the variables in FIG. 3.

Figure 4:
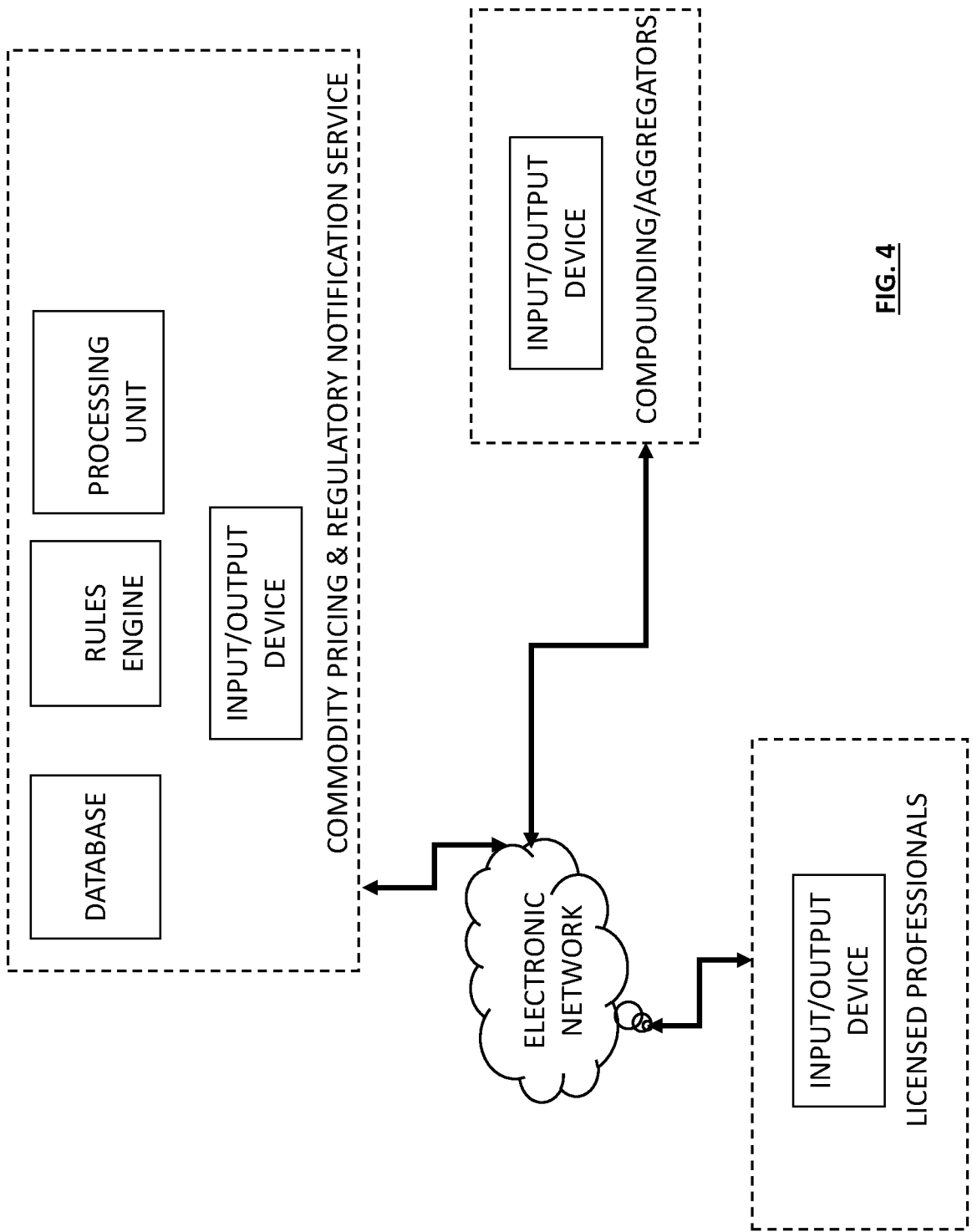
FIG. 4 is a system for communicating the via the central method network claimed herein.

FIG. 4 is a system for communicating the via the central method network claimed herein. Through and electronic network, the database, rules engine and processing unit are connected to Compound Centers/Agriculture Aggregators and Licensed Professionals.

From the above description of the invention, those skilled in the art will perceive improvements, changes, and modifications in the invention. Such improvements, changes, and modifications within the skill of the art are intended to be covered. Likewise, one skilled in the art will recognize that the order of certain steps in the method may be combined, deleted or rearranged without diminishing the scope of the invention.

What is claimed is:

1. A method of soliciting bids from competing providers for a customized formulary compound, comprising:
receiving, from a licensed professional, specifications for a customized formulary compound,
wherein the specifications include a route of administration, a dosage form, one or more active ingredients, a strength for at least one of the one or more active ingredients, an address for delivery, and a date for delivery;
transmitting the specifications to a plurality of competing providers;
receiving a response from each of one or more of the plurality of competing providers,
wherein the response includes a formulary pricing for the customized formulary compound and a current government regulatory status of the competing provider;
publishing a list of the responses to the licensed professional after receiving at least a minimum threshold number of responses,
wherein the published list of responses includes the formulary pricing and the current government regulatory status for each of the competing providers; and upon receiving an indication from the licensed professional of a selected competing provider from the published list, notifying the selected competing provider.

2. The method of claim 1, wherein the provider is a Compounding Center or an Agriculture Aggregator.

3. The method of claim 1, wherein the plurality of competing providers to which the specifications are transmitted are selected by the licensed professional.

4. The method of claim 1, wherein receiving the response includes marking the response as accepted and time-stamping the response.

5. The method of claim 1, wherein the minimum threshold number of responses is seven.

6. The method of claim 1, wherein the specifications further include one or more formulary restrictions.

7. The method of claim 1, wherein the specifications further include one or more excipients.

8. A server for collecting customized formulary pricing and government regulatory status information from a plurality of competing providers, comprising:
- a database; and
- a processing unit, wherein the processing unit is configured to:
  - receive, from a licensed professional, specifications for a customized formulary compound,
    - wherein the specifications include a route of administration, a dosage form, one or more active ingredients, a strength for at least one of the one or more active ingredients, an address for delivery, and a date for delivery;
  - transmit the specifications to a plurality of competing providers;
  - receive, from each of one or more of the plurality of competing providers, a response,
    - wherein the response includes a formulary pricing for the customized formulary compound and a current government regulatory status of the competing provider;
  - publish a list of the responses to the licensed professional after receiving at least a minimum threshold number of responses,
    - wherein the published list of responses includes the formulary pricing and the current government regulatory status for each of the competing providers; and
  - upon receiving an indication from the licensed professional of a selected competing provider from the published list, notify the selected competing provider.

9. The server of claim 8, wherein the provider is a Compounding Center or an Agriculture Aggregator.

10. The server of claim 8, wherein the plurality of competing providers to which the specifications are transmitted are selected by the licensed professional.

11. The server of claim 8, wherein receiving the response includes marking the response as accepted and time-stamping the response.

12. The server of claim 8, wherein the minimum threshold number of responses is seven.

13. The server of claim 8, wherein the specifications further include one or more formulary restrictions.

14. The server of claim 8, wherein the specifications further include one or more excipients.

* * * * *